United States Patent
Anagnostopoulos et al.

(10) Patent No.: US 6,638,693 B2
(45) Date of Patent: Oct. 28, 2003

(54) PROCESS FOR MAKING MEDIA FOR HIGH QUALITY INK JET PRINTING

(75) Inventors: Constantine N. Anagnostopoulos, Mendon, NY (US); Emmanuel K. Dokyi, Rochester, NY (US); Ravi Sharma, Fairport, NY (US); Mridula Nair, Penfield, NY (US); Zhihao Yang, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 156 days.

(21) Appl. No.: 10/046,024

(22) Filed: Oct. 29, 2001

(65) Prior Publication Data

US 2003/0082353 A1 May 1, 2003

(51) Int. Cl.⁷ .................................................. G03C 5/00
(52) U.S. Cl. ...................................................... 430/322
(58) Field of Search .................. 347/105; 428/32.24, 428/32.25, 32.31; 430/322

(56) References Cited

U.S. PATENT DOCUMENTS

| | | | |
|---|---|---|---|
| 6,045,917 A | 4/2000 | Missell et al. | 428/411.1 |
| 6,197,482 B1 | 3/2001 | Lobo et al. | 430/350 |

FOREIGN PATENT DOCUMENTS

| | | |
|---|---|---|
| WO | WO 99/55537 | 11/1999 |
| WO | WO 00/73082 | 12/2000 |

OTHER PUBLICATIONS

Kenzo Kasahara, "A New Quick–Drying, High–Water–Resistant Glossy Ink Jet Paper," Proceedings IS&T's NIP 14: 1998 International Conference on Digital Printing Technologies, Toronto, Canada, Oct. 18–23, 1998, pp 150–152.

Aidan Lavery, "Photomedia for Ink Jet Printing," Proceedings IS&Ts NIP 16: 2000, International Conference on Digital Printing Technologies, Vancouver Canada, Oct.16–20, 2000, pp 216–220.

Dieter Reichel and Willy Heinzelmann, "Anisotropic Porous Substrates for High Resolution Digital Images," Proceeding IS&Ts NIP 16: 2000 International Conference on Digital Printing Technologies, Vancouver Canada, Oct. 16–20, 2000, pp 204–207.

Primary Examiner—Bruce H. Hess
Assistant Examiner—B. Shewareged
(74) Attorney, Agent, or Firm—Arthur E. Kluegel

(57) ABSTRACT

Disclosed is media for receiving jetted ink comprising a support bearing a predetermined array of three dimensional cells composed of hydrophobic walls and having a hydrophilic base, the cross-section of the cells parallel to the support being of a size sufficiently small so as to increase the range of color density gradations attainable.

20 Claims, 19 Drawing Sheets

PROCESS FOR MAKING MEDIA FOR HIGH QUALITY INK JET PRINTING

CROSS-REFERENCE TO RELATED APPLICATIONS

This application relates to commonly assigned co-filed applications Ser. No. 10/039,441, (Attorney Docket No. 82395) which is directed to an ink jet imaging media containing small cells and Ser. No. 10/045,686, (Attorney Docket No. 83230) which is directed to a cellular media for forming an overcoat.

FIELD OF THE INVENTION

This invention relates to a process for making media for receiving jetted ink in which photo-resist and etching steps are employed to create a hydrophobic array on an ink-absorbing media.

BACKGROUND OF THE INVENTION

Prints made using an ink-jet printer desirably have image resolution of about 6 line pairs/mm, which corresponds to about 84 $\mu$m per line or equivalently about 300 dots per inch. They must have a dynamic range of about 128 gray levels or more in order to be comparable in image quality to conventional photographic prints.

Secondary colors are formed as combinations of primary colors. The subtractive primary colors are cyan, magenta and yellow and the secondary ones are red, green and blue. Gray can be produced by equal amounts of cyan magenta and yellow, but less fluid is deposited on the paper if the gray is produced from an ink supply containing only black dye or pigment.

Consider a typical print head emitting 4 pL drops and that a saturated spot of a secondary color is to be formed. The 4 pL droplet has a diameter of about 20 $\mu$m in the air and forms a disk of about 30 $\mu$m on the paper. Adjacent droplets are typically aimed to be placed on 21 $\mu$m centers so that adjacent disks on the paper have some overlap and thus ensure that full area coverage is obtained and that jet misdirections do not produce visible artifacts. Then, as taught in U.S. Pat. No. 6,089,692, of Anagnostopoulos, if a saturated spot of a secondary color is to be formed, at least 256 droplets (128 of each of the primary colors) have to be deposited per 84×84 $\mu$m$^2$ area. The amount of fluid deposited per unit area is then about 145 mL/m$^2$. The problem, however, is that this is at least a factor of 6 higher than the fluid holding capacity of commercial photo-grade ink-jet papers. See for example Kenzo Kasahara, "A New Quick-Drying, High-Water Resistant Glossy Ink Jet paper," Proceedings IS&T's NIP 14: 1998 International Conference on Digital printing Technologies, Toronto, Canada, Oct. 18–23, 1998, pp 150–152.

One way of solving this first problem is to increase the fluid capacity of the ink-jet paper by increasing the thickness of the image-receiving layer. This is typically not advisable because color saturation and image resolution are reduced since the dyes diffuse too far below the surface. Another way of increasing the apparent fluid holding capacity is to allow some evaporation to take place before depositing additional droplets. This increases the printing time and is thus also not acceptable. A third solution is to have inks available at the print head of different colorant concentrations. Thus, the high color density areas are printed with dots that have high concentration of colorant while the light color areas on the print are made with low colorant concentration droplets. This approach substantially increases the cost to the consumer and is thus also not an acceptable solution. Furthermore, the image quality is not photographic when a limited choice of ink colorant densities are available at the print head.

A second problem with regards to producing photographic quality ink-jet prints is that the penetration rate of ink into the image-receiving layer of presently available porous or swellable commercial receivers is too low. This is because the media are purposely made to have small surface pores in order to have a glossy finish. Consequently the printing algorithms are written such that they do not allow a droplet to be placed on top or adjacent to another droplet until sufficient time has elapsed. This results in slow printing time and is therefore unacceptable. If an attempt is made to print faster, coalescence and color bleed are observed. That is, the small pores prevent the first ink droplet from being absorbed into the paper quickly enough and, if the next droplet arrives too soon, the two merge or coalesce into one large one. This reduces the image resolution. Color bleed is essentially the same effect as coalescence, except that the two droplets that merge contain different color colorants. The effect is poor image sharpness and color quality.

There are a large number of commercial ink-jet papers. Two of the most successful are described briefly here. The first is shown in FIG. 1. The receiver, as described in U.S. Pat. No. 6,045,917 of Missell et al., consists of a plain paper base covered by a polyethylene coat. This coat prevents any fluid, especially water from the ink, from penetrating into the paper base and causing puckering or wrinkling termed "cockle". The front side of the paper is additionally coated with two layers of polymers containing mordant. The polymer layers absorb the ink by swelling while the dyes are immobilized in the mordant. An anti-curl layer is also coated in the backsides of this paper.

The second commercial paper is described by Kenzo Kasahara, in "A New Quick-Drying, High-Water Resistant Glossy Ink Jet paper," Proceedings IS&T's NIP 14: 1998 International Conference on Digital printing Technologies, Toronto, Canada, Oct. 18–23, 1998, pp 150–152, and is shown in FIG. 2. Like the first paper, the paper base is coated with a polyethylene film to prevent cockle. The image-receiving layer consists of three separate layers. Each one is made up of ICOS (inorganic core/organic shell) particles in a polyvinyl alcohol binder and boric acid hardener, forming a micro-porous structure. The porosity of all three layers combined is about 25 ml/m$^2$. Each of the ICOS particles, of the order of 0.05 $\mu$m in diameter, consists of an anionic silica core surrounded by a cationic polymer shell.

Other recent articles describe ink jet papers with surface pores or micro-capillaries formed by alumina or silica particles (see for example Aidan Lavery, "Photomedia for Ink Jet printing," Proceedings IS&Ts NIP16: 2000, International Conference on Digital Printing Technologies, Vancouver Canada, October 16–20, 2000, pp 216–220) or micels (see for example Dieter Reichel and Willy Heinzelmann, "Anisotropic porous Substrates for High Resolution Digital Images," Proceeding IS&Ts NIP16: 2000 International Conference on Digital Printing Technologies, Vancouver Canada, Oct. 16–20, 2000, pp 204–207). In all these cases the goal is to rapidly move the fluid, through capillary action, below the surface so as to reduce coalescence and color bleed, which occurs mostly at the surface. None of these, however, move the fluid fast enough to meet the productivity needs required for photographic quality prints.

Inkjet print heads have been recently invented that are page wide and have nozzle spacing of finer than 300 per inch. See, for example, U.S. Pat. No. 6,079,821, of Chwalek et al. Such print heads produce 1 to 2 pL drops which are smaller than the typical droplets produced by the commercial print heads. Also, because they are page wide and have a large number of nozzles, they are capable of ink lay down rates substantially higher than that of the scanning type conventional ink-jet printers. But coalescence and color bleed at the receiver surface compromise their productivity. This constitutes the third problem, namely that the present receiver media seriously limit the productivity of these advanced print heads.

Finally, for desired resolution and color saturation, the colorant should reside within only a few microns from the surface of the receiver.

A need exists for making an image receiver media that is capable of accepting fluid lay down quantities that exceed the amount their image receiving layer can hold and that allow a droplet to be placed simultaneously on top or adjacent to a previous one without coalescence or color bleed between adjacent droplets.

SUMMARY OF THE INVENTION

The invention provides a media for receiving jetted ink containing imaging colorant, comprising a support bearing a predetermined array of three dimensional cells composed of hydrophobicwalls and having a hydrophilic base, the cross-section of the cells parallel to the support being of a size sufficiently small so as to improve the range of color saturation attainable.

Embodiments of the invention are capable of accepting fluid lay down quantities that exceed the amount their image receiving layer can hold and that allow a droplet to be placed simultaneously on top or adjacent to a previous one without coalescence or color bleed between adjacent droplets.

DETAILED DESCRIPTION OF THE INVENTION

Figure 1:
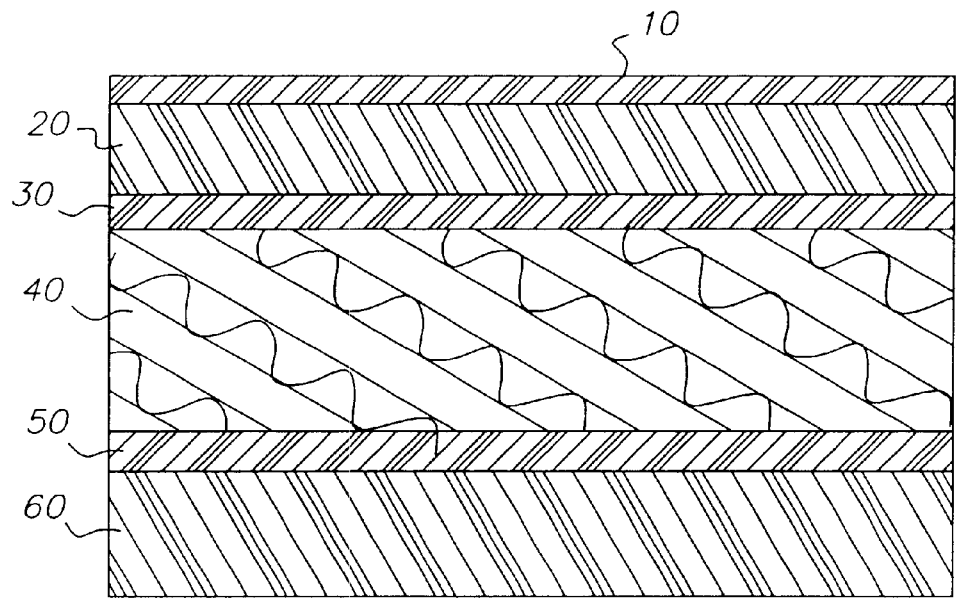
FIGS. 1 and 2 are schematic examples showing cross sectional views of two conventional ink-jet media of the prior art.
Figure 3A:
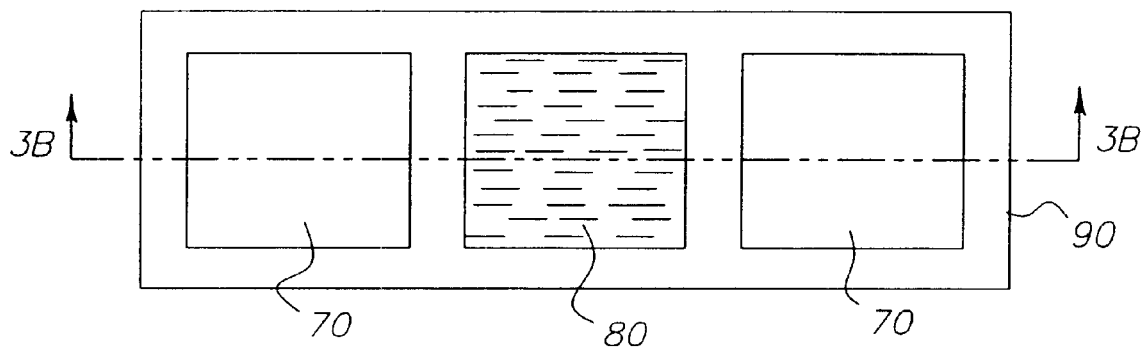
FIGS. 3 and 4 are schematic cross-sectional views of two different embodiments of ink-jet media of the invention.
Figure 3B:
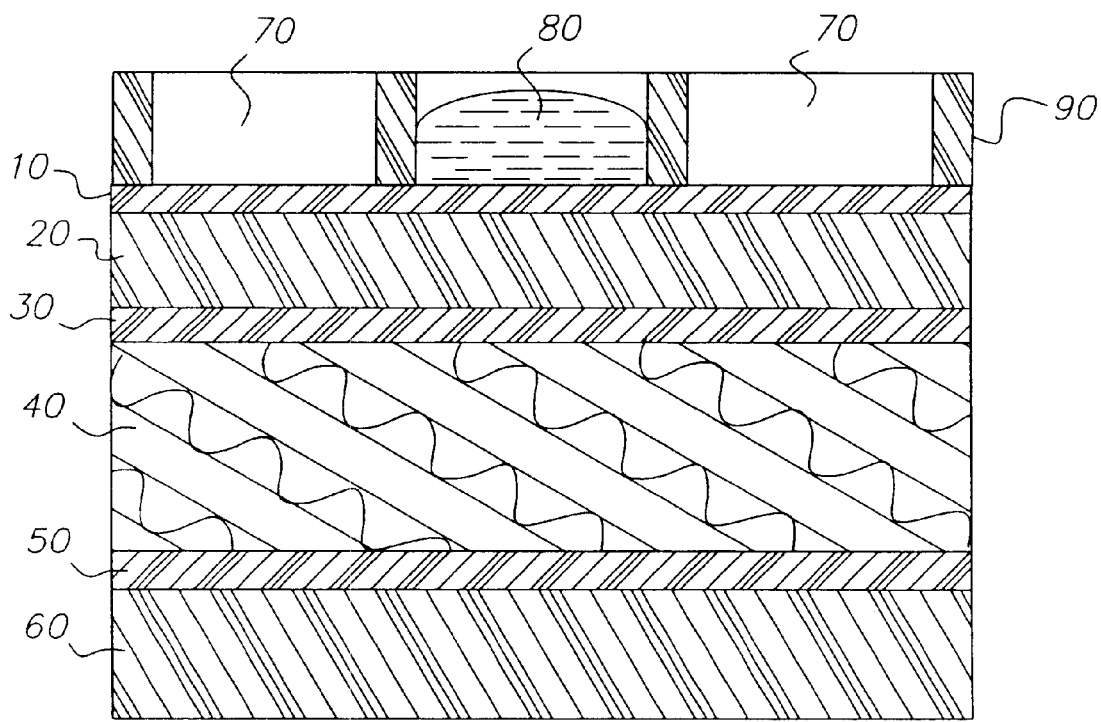

The media of the present invention is different from conventional media in that it does not depend on ink diffusion or absorption by capillary action to avoid coalescence and color bleed. Instead the surface of the receiver is covered with a predetermined array of regular shaped reservoirs or cells that hold the fluid and keep it from communicating with adjacent drops. Such a cell array is shown in FIG. 3 and is formed on top of the conventional ink-jet paper shown in FIG. 1. The term bonded is employed herein to generically indicate that successive layers or deposits form an integral structure, with or without an adhesion promoting material. FIG. 1 shows a prior art ink-jet media comprising a paper support 40 separated from backside anti-curl layer 60 by polyethylene resin film 50. The paper support is coated with polyethylene resin film 30, bottom swellable polymer containing mordant 20 and top swellable polymer containing mordant 10. The polyethylene resin prevents the ink carrier fluid from entering the paper.

Figure 2:
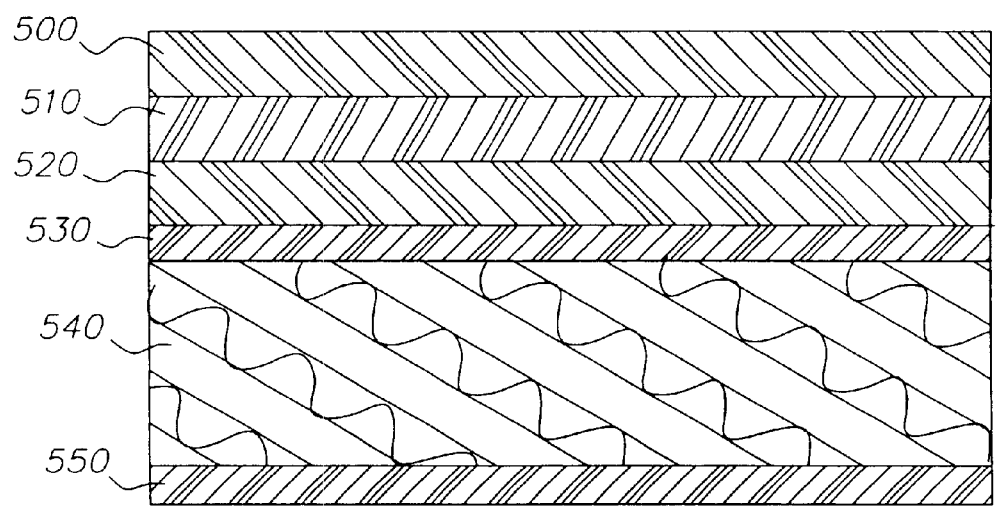

FIG. 2 shows a similar prior art media to FIG. 1, comprised of polyethylene layers 550 and 530 sandwiched about paper support 540 and bearing image receiving layers 500, 510, and 520.

FIG. 3 shows the inventive embodiment corresponding to FIG. 1 in which the hydrophobic walls 90 of the cells 70, are supported on the swellable polymer 10. Recently deposited ink droplet 80 is contained in the cell.

Figure 4A:
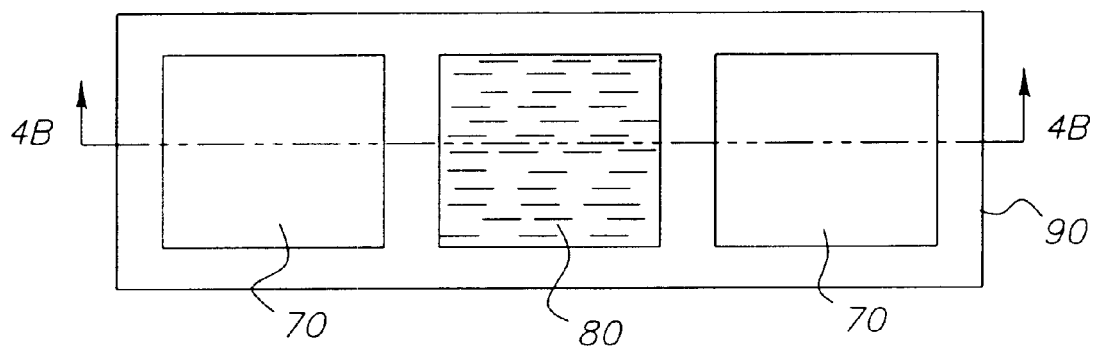
Figure 4B:
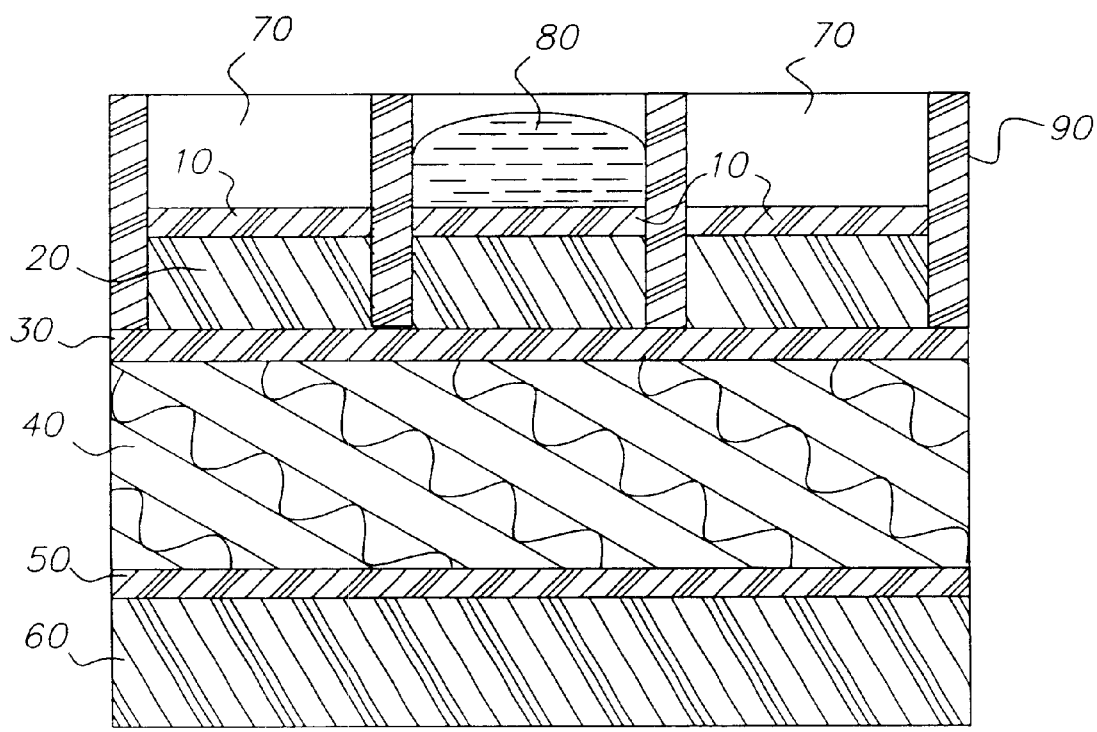

An alternative architecture is shown in FIG. 4 where the cell array is built on top of the polyethylene coat and then the image-receiving layer is deposited on the base of each cell. FIG. 4 shows the inventive embodiment corresponding to FIG. 1 in which the hydrophobic walls 90 of the cells 70 are bonded to the polyethylene layer 30.

Figure 5:
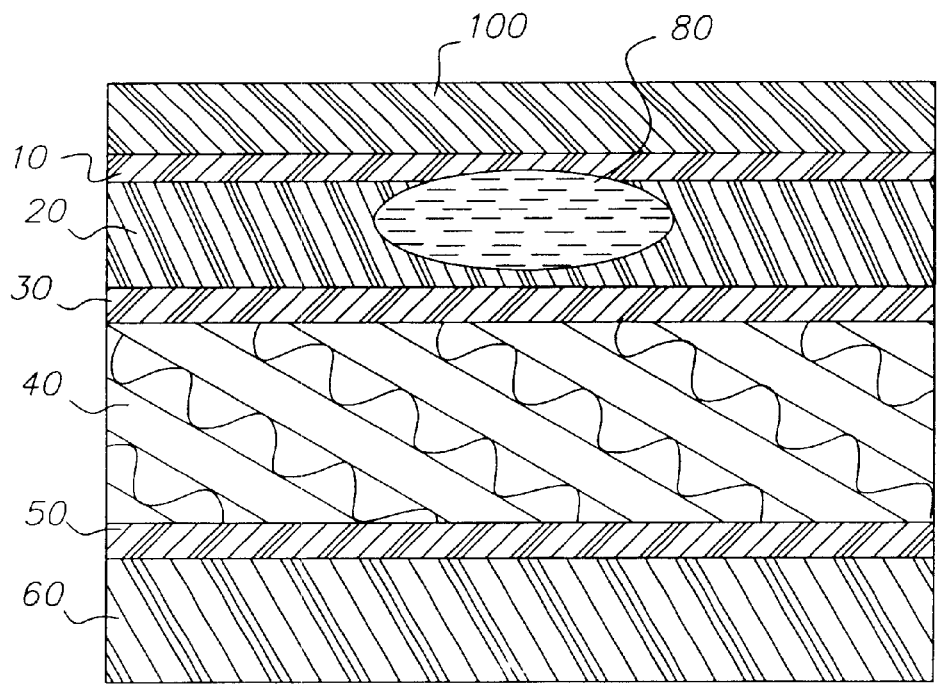
FIGS. 5 and 6 are schematic cross sectional views of the embodiments of FIGS. 3 and 4 after fusing of the cell wall structure.
Figure 6:
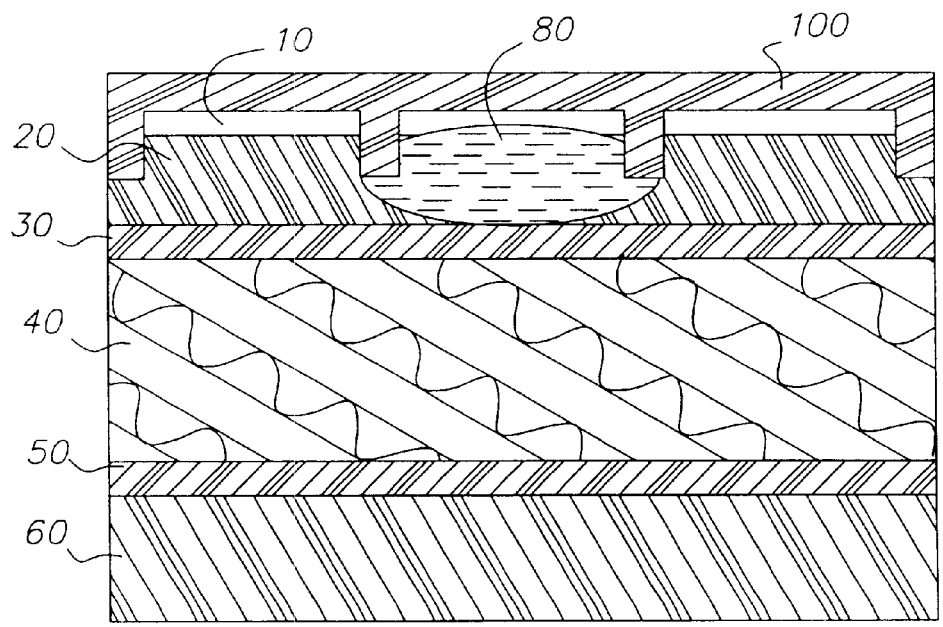

FIG. 5 shows the schematic cross section of FIG. 3 after fusing in which the hydrophobic walls have been converted to a protective layer 100 and ink droplet 80 has spread out during absorption. FIG. 6 shows the schematic cross section of FIG. 4 after fusing in which the hydrophobic walls have been converted to a protective layer 100. In operation, the cells receive the ink from the print head and by the end of the printing cycle much of the ink still remains confined in the cells. The receiver is then moved to a holding area and kept there until most of the volatile portion of the ink evaporates. Because of the cell structure, the paper sheets can be stacked one on top of each other since the cell walls can serve as standoffs. If the cells are left standing, they will produce a structured or matte surface appearance because of the light scattering off the cell walls. If a glossy finish is desired, then the media may, after application of the ink, be subjected to elevated temperature and/or pressure e.g. via a heated roller that melts or fuses the walls of the cells. This process gives the image a glossy finish and forms a continuous protective film, shown schematically in FIGS. 5 and 6, similar to what lamination accomplishes. This protects the image from water, air borne pollutants and abrasion damage and may offer UV or other protection for long colorant stability and image life. In FIG. 6, the portions of the cell walls adjacent to the image-receiving layer are shown broken. This occurs during melting to allow colorant diffusion sideways for better image quality.

Figure 7:
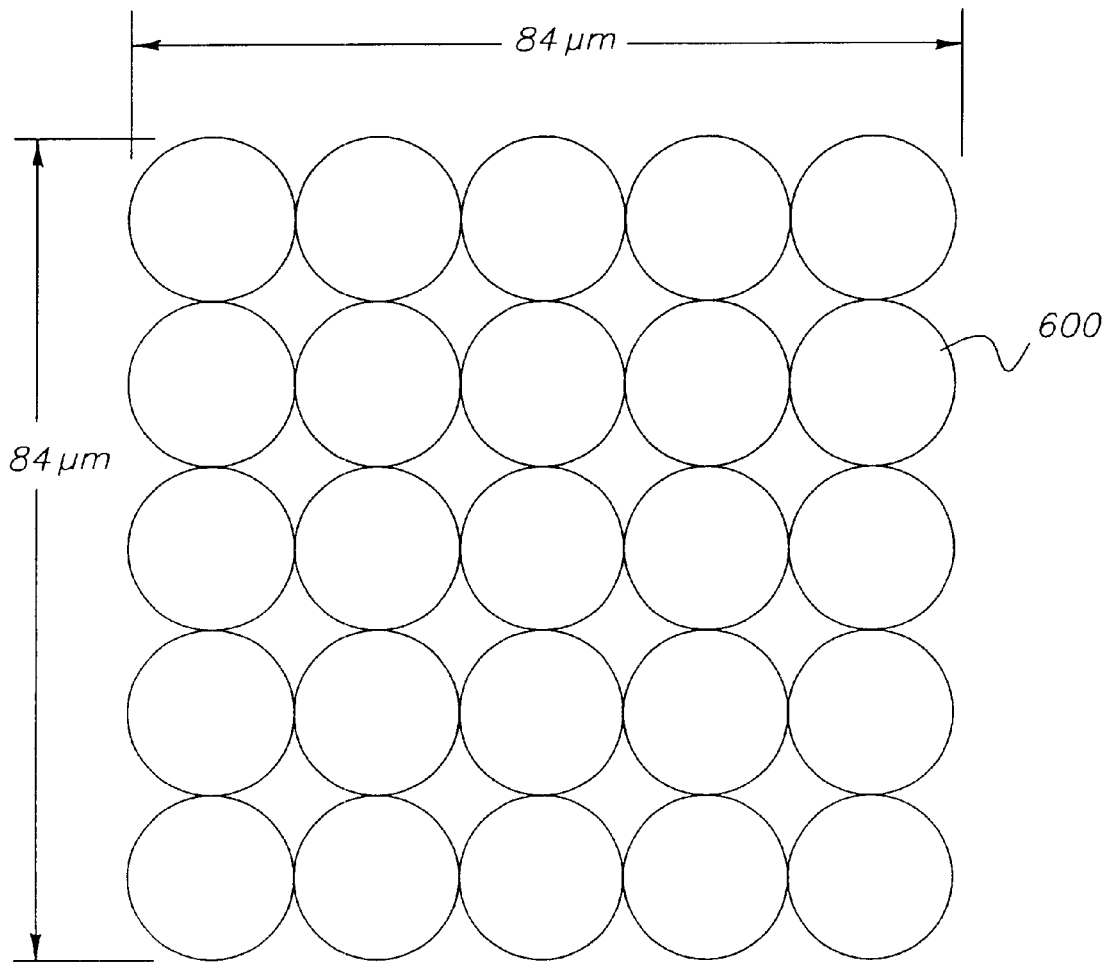
FIG. 7 is a schematic showing the 5×5 sub-pixel make up of an 84×84 μm pixel.

The desired cell array, area, and volume depend on the desired final image quality. If it is assumed that the newest print head technology produces 1 pL drops, the drops are about 12 $\mu$m diameter spheres when in the air and produce an image of a circular disc on conventional ink jet papers of a diameter about 50% larger than their diameter in air. The increase depends on the drop velocity, how hydrophilic the surface is, and the rate of absorption of the fluid into the paper. Assume further that the colorant concentration in these drops is at the maximum value, that is, the disc formed on the paper results in an image that has maximum color saturation. For a secondary color, as discussed previously, two droplets are needed per site. Recall that the smallest spot size visible by the human eye is about 84×84 $\mu$m². Since a 1 pL droplet produces an image on the paper of about 18 $\mu$m in diameter, then the pixel can now be subdivided into an array of 5×5 subpixels, each about 17 $\mu$m in diameter, as shown in FIG. 7. FIG. 7 shows a theoretical 84×84 $\mu$m 5×5 pixel array containing 25 sub-pixels 600.

Figure 8:
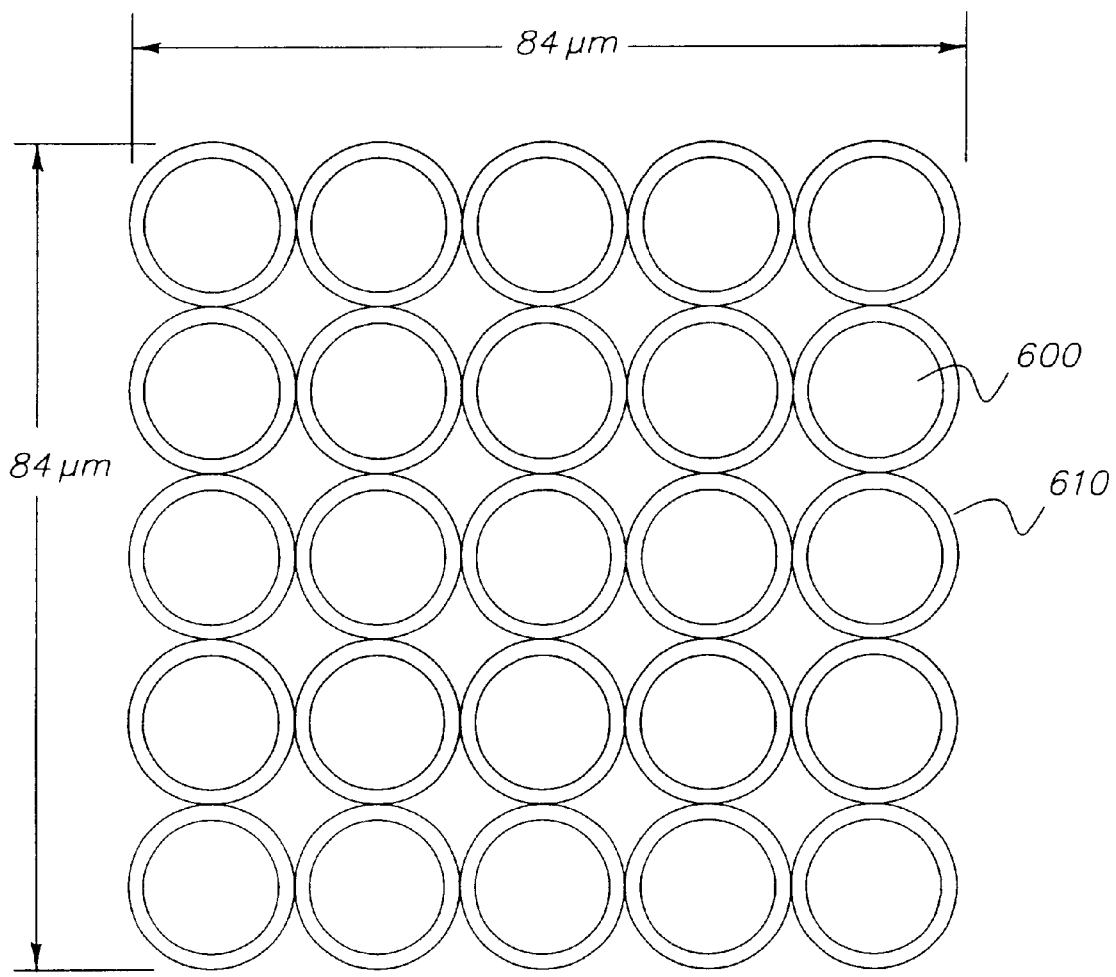
FIG. 8 is a schematic plan view of one cell arrangement useful in the invention.

Without any structures on the conventional papers, this would allow for some overlap of adjacent droplets as is desirable for full area coverage. Because the pixel is subdivided into 25 subpixels, a dynamic range of 26 is thus obtained. However, the desired dynamic range for full photographic quality images is 128 or higher, as it was discussed above. One way of preventing coalescence and color bleed, in this lower image quality paper, is to create a ring pattern on the surface of the conventional ink jet paper consisting of a transparent hydrophobic film, as shown in FIG. 8. FIG. 8 shows an array as in FIG. 7 comprised of the hydrophobic walls 610 and the hydrophilic ink absorbing area of subpixel 600.

Figure 9:
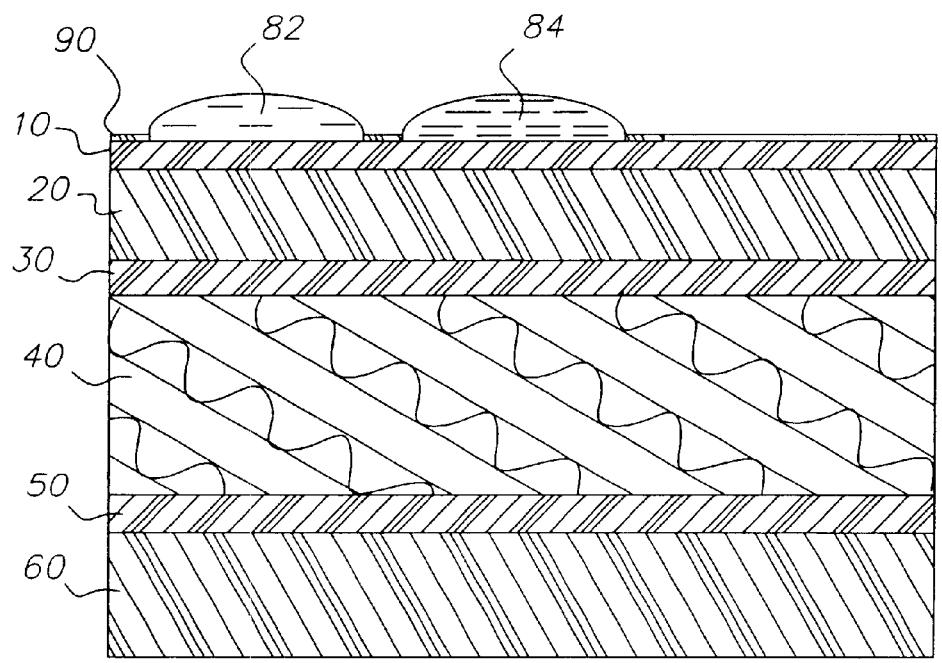
FIG. 9 is a schematic cross sectional view showing the separation of droplets.

Other patterns may also be suitable. A schematic cross sectional view of two adjacent subpixels containing fluid is shown in FIG. 9. FIG. 9 shows how the embodiment of FIG. 3 separates different colored ink drops 82 and 84 from each other. The hydrophobic film prevents the spreading of the fluid on the surface and thus contains the droplets within their corresponding subpixel, thus preventing coalescence. The line widths of the hydrophobic rings may vary from 1 to 10 $\mu$m and their height can vary from <<1 $\mu$m to >1 $\mu$m. However, since no ink stays on top of the hydrophobic areas, for full colorant area coverage, the ink will desirably diffuse under them from the adjacent hydrophilic regions. In the instances where the hydrophobic material is very thin, these rings cannot be melted in order to provide water, abrasion and UV protection for the image.

One disadvantage of using full colorant concentrated inks is that in the low density areas of an image, where droplets are placed far apart, the image looks grainy or noisy in those locations. This is the reason many commercial ink jet printers have two extra ink supplies one of low colorant density cyan color and one low colorant density magenta color.

To obtain a higher image quality, the subpixels must be able to contain more than one or two droplets of ink. This is accomplished by increasing the heights of the subpixel walls thus increasing their volume or ink holding capacity. Note that as it was disclosed in U.S. Pat. No. 6,089,692 of Anagnostopoulos, the colorant concentration in the ink must now be ⅛ or less the saturation value. That is, it takes 8 droplets one on top of another of one primary color to achieve a fully saturated spot of that color on the paper. For a secondary color 16 droplets are required, 8 of each primary color. The advantages of the diluted ink are higher dynamic range within a single pixel and, in the low-density areas of a print, less grain or noise without the need for extra supplies of low colorant density inks.

Figure 10:
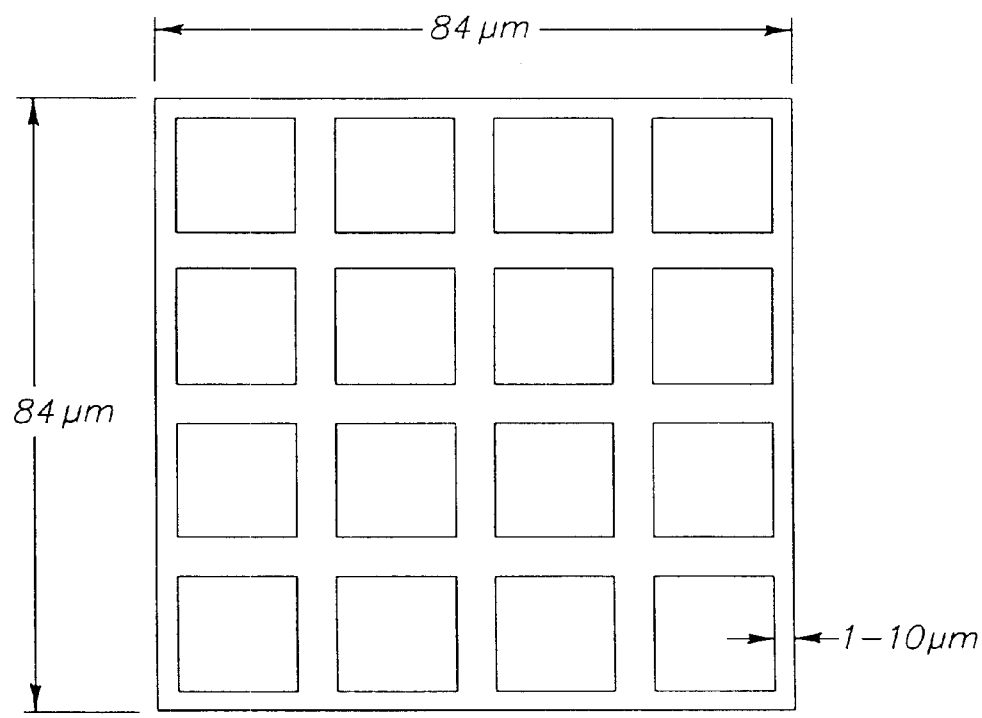
FIG. 10 is a schematic plan view of a second cell arrangement useful in the invention.

Rather than having circular cells, on the surface of the inkjet paper, we may have rectangular ones, as shown in FIG. 10, or hexagonal ones, because they can hold more fluid and fill the space more efficiently. FIG. 10 is another schematic plan view of an array of cells 100 bordered by the hydrophobic walls 90 in which the cells are rectangular or square in shape.

In the figure, the subpixel size is drawn 21×21 $\mu$m². Assuming again that the print head produces 1 pL droplets and that the walls of the cells are 2 $\mu$m wide, then for a fully saturated primary color spot the wall heights have to be about 28 $\mu$m to accommodate 8 pL of fluid or about 8,000 $\mu$m3 of fluid volume per pixel. For a fully saturated secondary color spot the wall heights will have to be about 56 $\mu$m. This will give a maximum of 129 levels of gray per pixel, 16 subpixels×8 levels of gray per subpixel equals 128. The null, that is no ink in a subpixel, adds another level. As droplets are deposited within each subpixel evaporation and diffusion of the ink is taking place, thus these wall heights represent the worst case maximum they need to be.

To avoid possible Moiré pattern formations, it may be desirable to place the cells on the paper in a predetermined pseudo-random pattern but not a regular grid arrangement as shown in FIG. 10.

Figure 11:
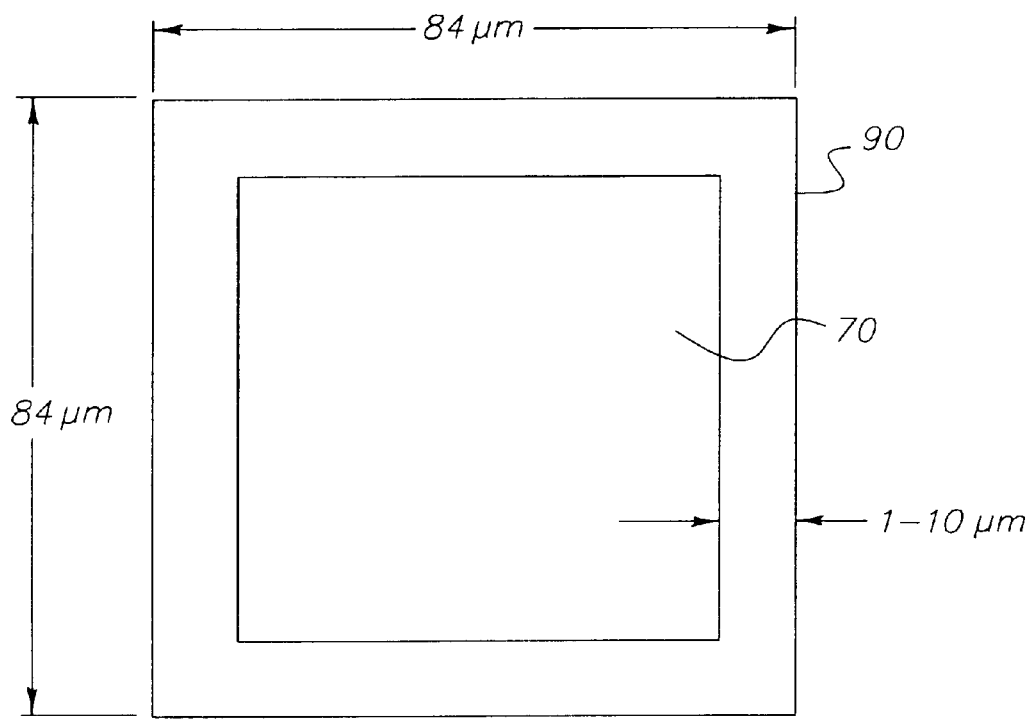
FIG. 11 is a schematic plan view of a relatively large size cell useful in the invention.

Alternatively, the sub-pixels may be eliminated and the cell thus comprises the entire pixel, as shown in FIG. 11. The cells must then have a fluid holding capacity of 128 pL per pixel for a saturated primary color spot and 256 pL for a secondary color spot. Assuming 21 $\mu$m thick walls, the wall heights have to be about 20 and 40 $\mu$m respectively. For these large area cells, attention should be given to the requirement that when the walls are melted at the end of the printing step they provide at least about a 2 μm thick protective film over each pixel on the paper. This condition is met for walls that are at least 20 μm high.

Figure 12A:
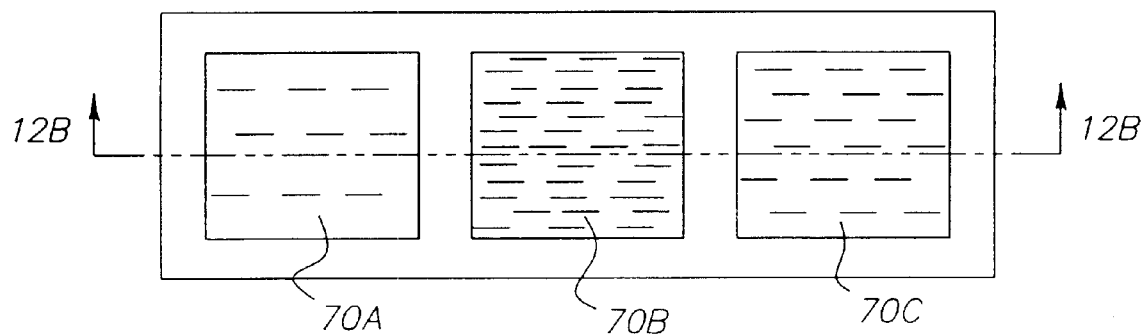
FIGS. 12A and 12B represent a plan view and front section along the line 12B—12B, respectively, of a cell arrangement of the invention.
Figure 12B:
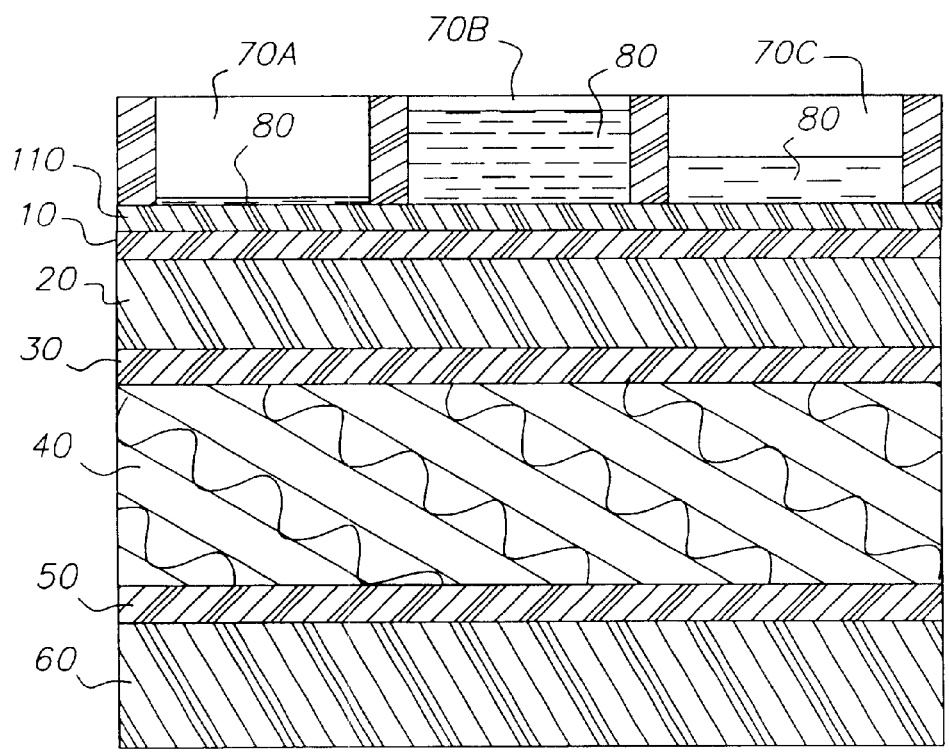

One problem with the large area cells is that if only a few droplets are deposited in a pixel, as will be the case for low-density image areas, then grain or noise will appear, because the small amount of fluid deposited will not be enough to cover the base of the cell. One way to solve this problem is to have a hydrophilic slow-absorbing layer 110 in the base of the cells. This layer will then cause even a single drop to spread throughout the cell area prior to absorption as is demonstrated in FIGS. 12 and 13, thus reducing grain.

Another advantage of having the cell array on the receivers and depositing the various color inks in them simultaneously, that is long before a substantial absorption into the image receiving layer occurs, is that the various colorant will have time to mix thus producing truer color.

Figure 14A:
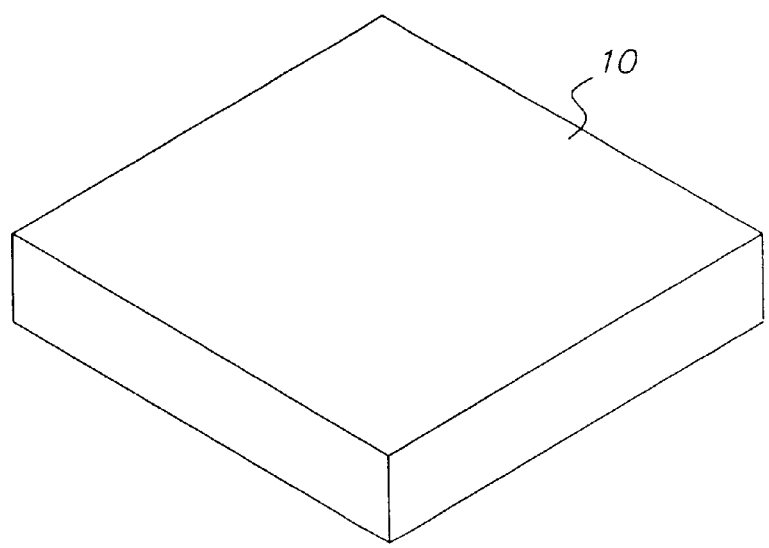
FIGS. 14A–14I represent a sequential perspective view of a method of forming a four-cell segment of a media of the invention.
Figure 13A:
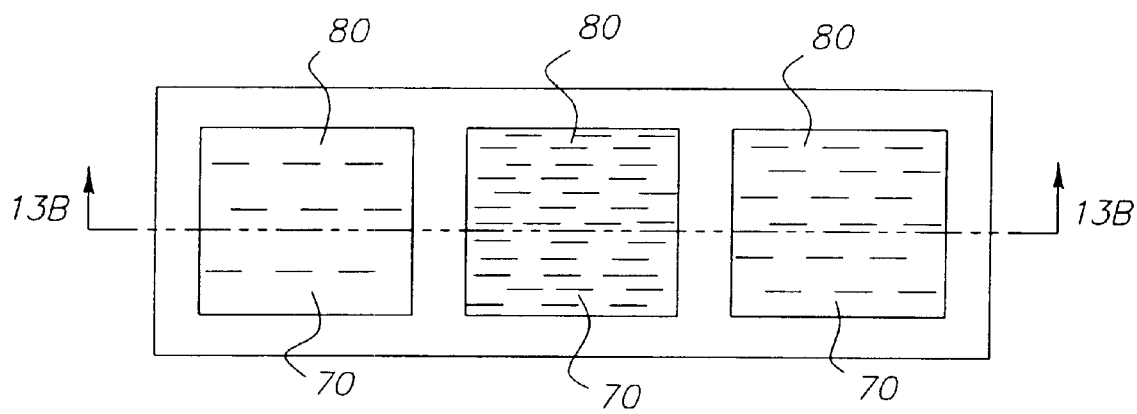
FIGS. 13A and 13B represent a plan view and front section along the line 13B—13B, respectively, of a further cell arrangement of the invention.
Figure 13B:
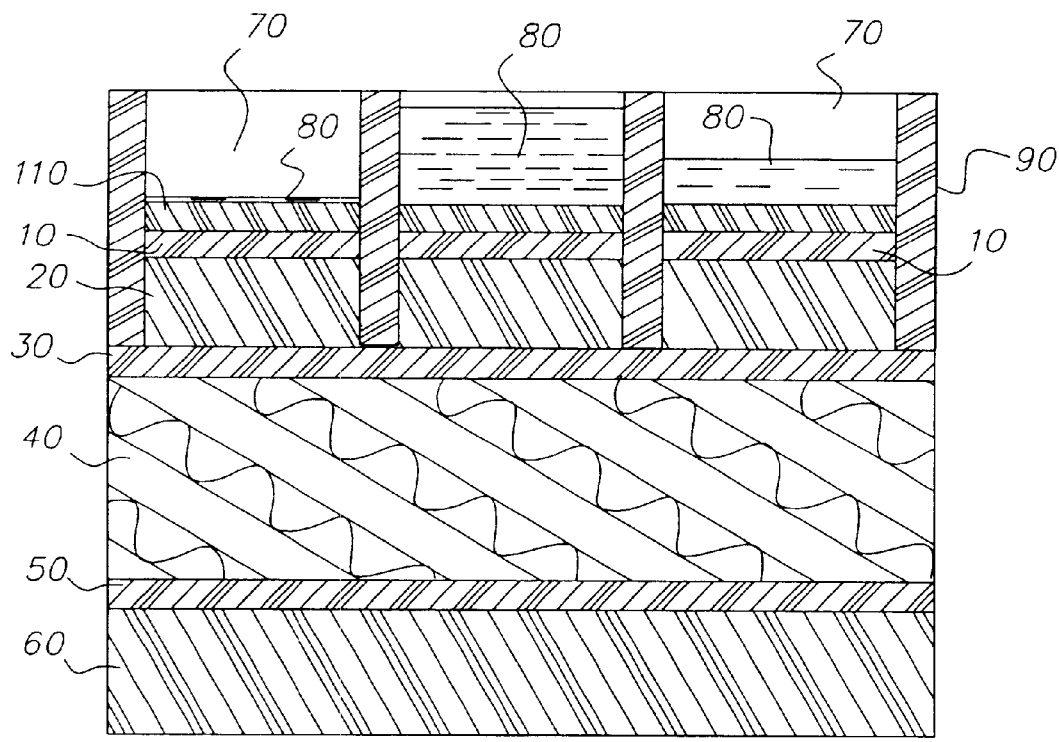
Figure 14B:
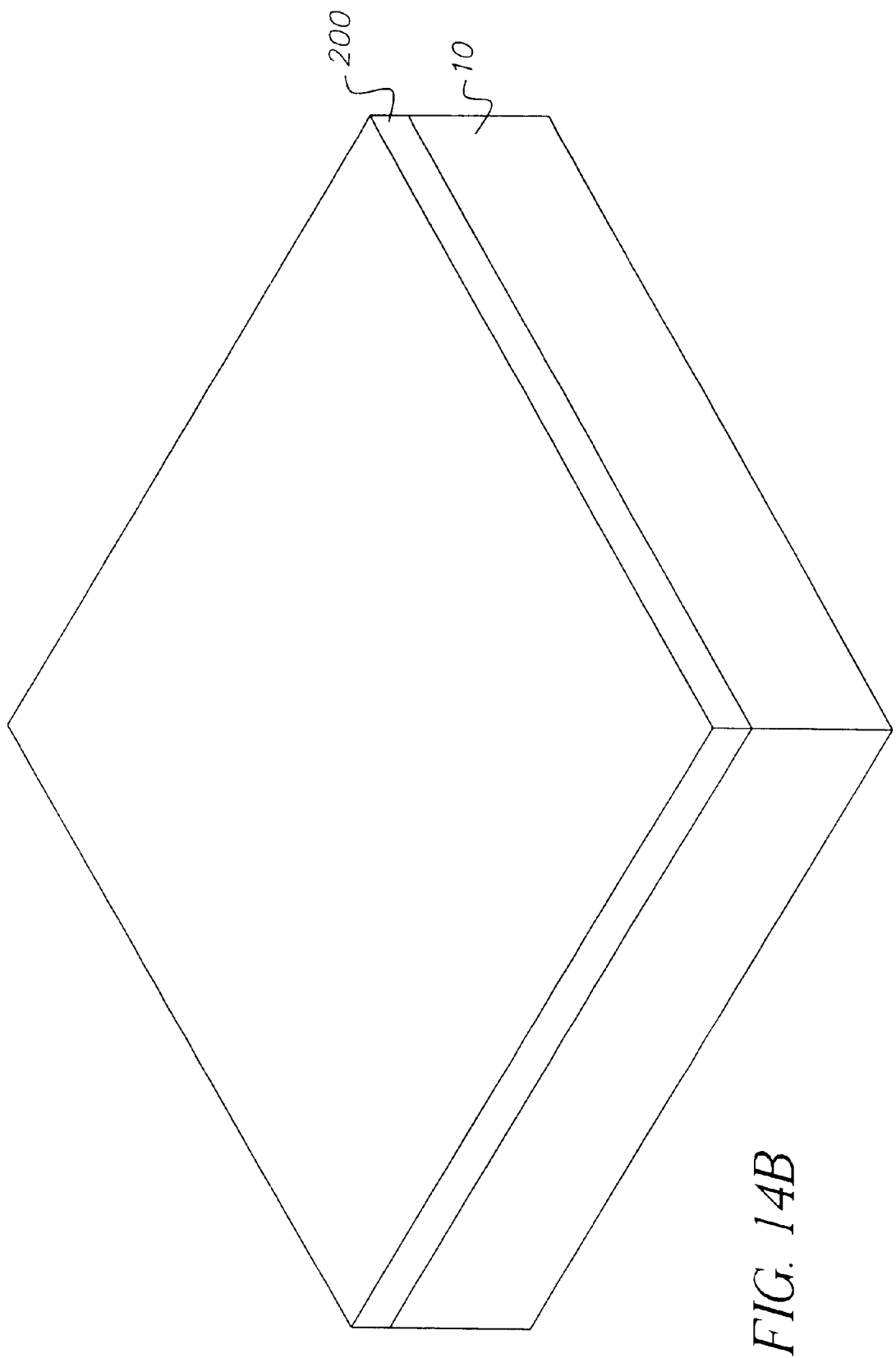
Figure 14C:
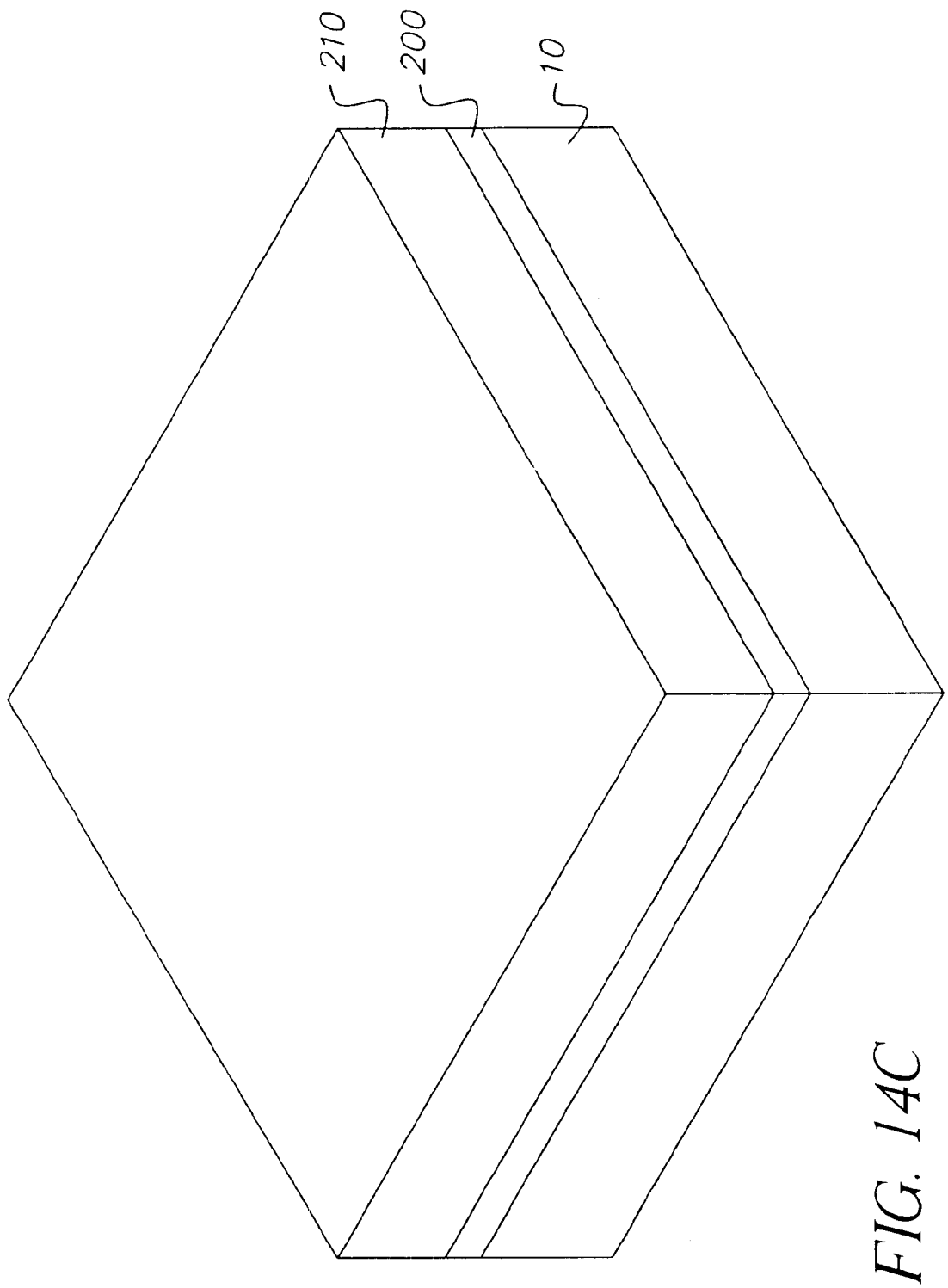
Figure 14D:
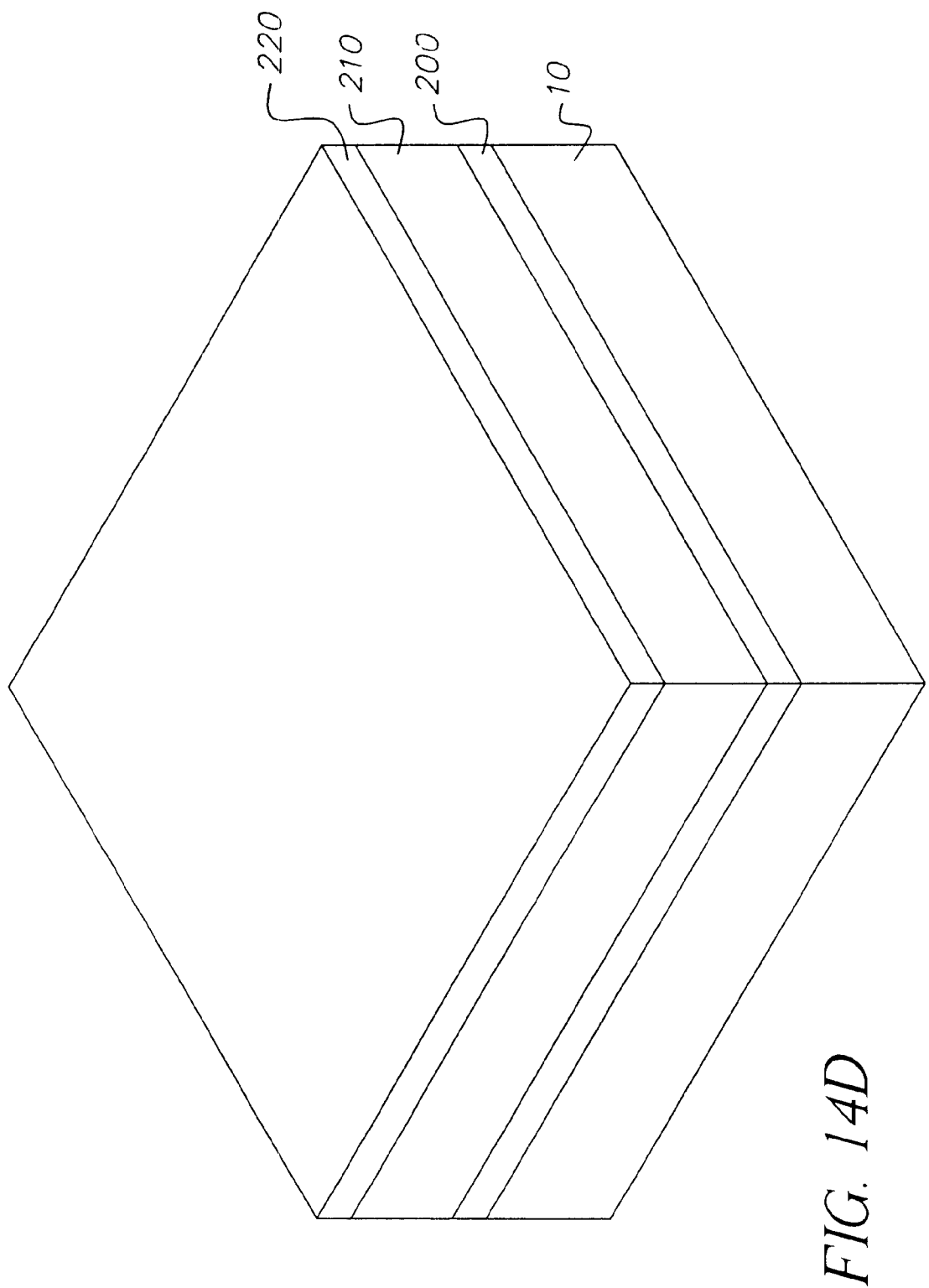
Figure 14E:
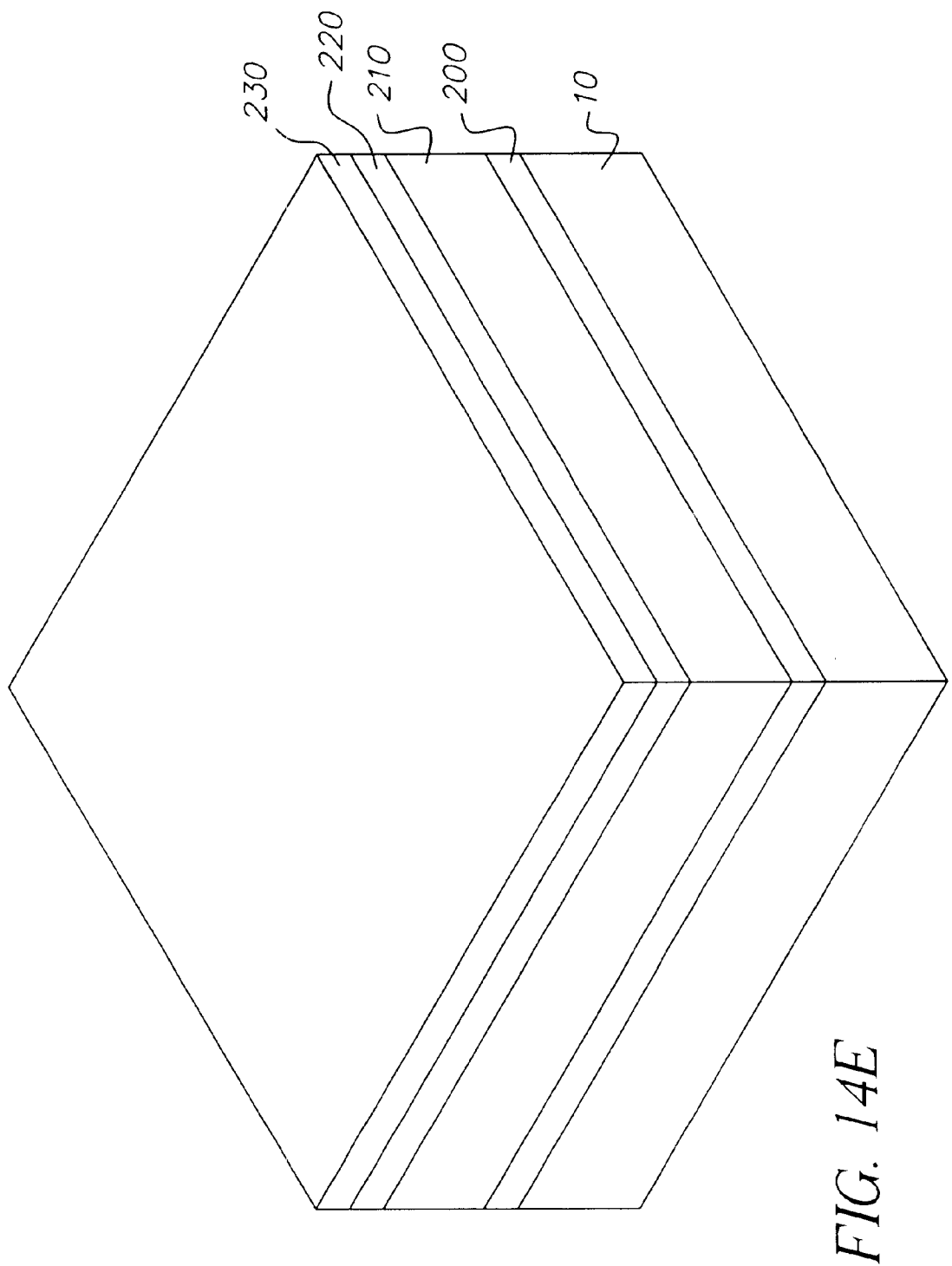
Figure 14F:
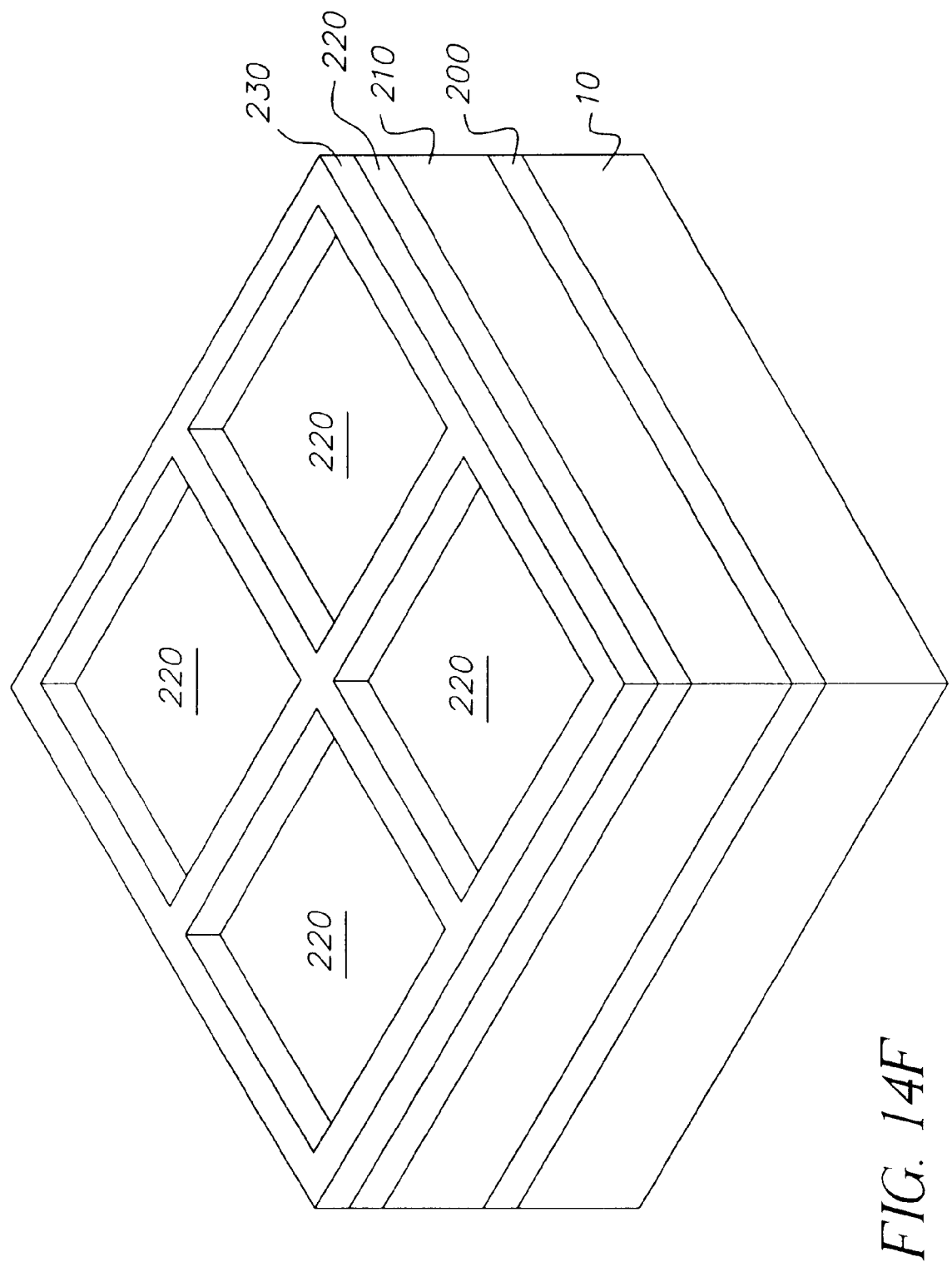
Figure 14G:
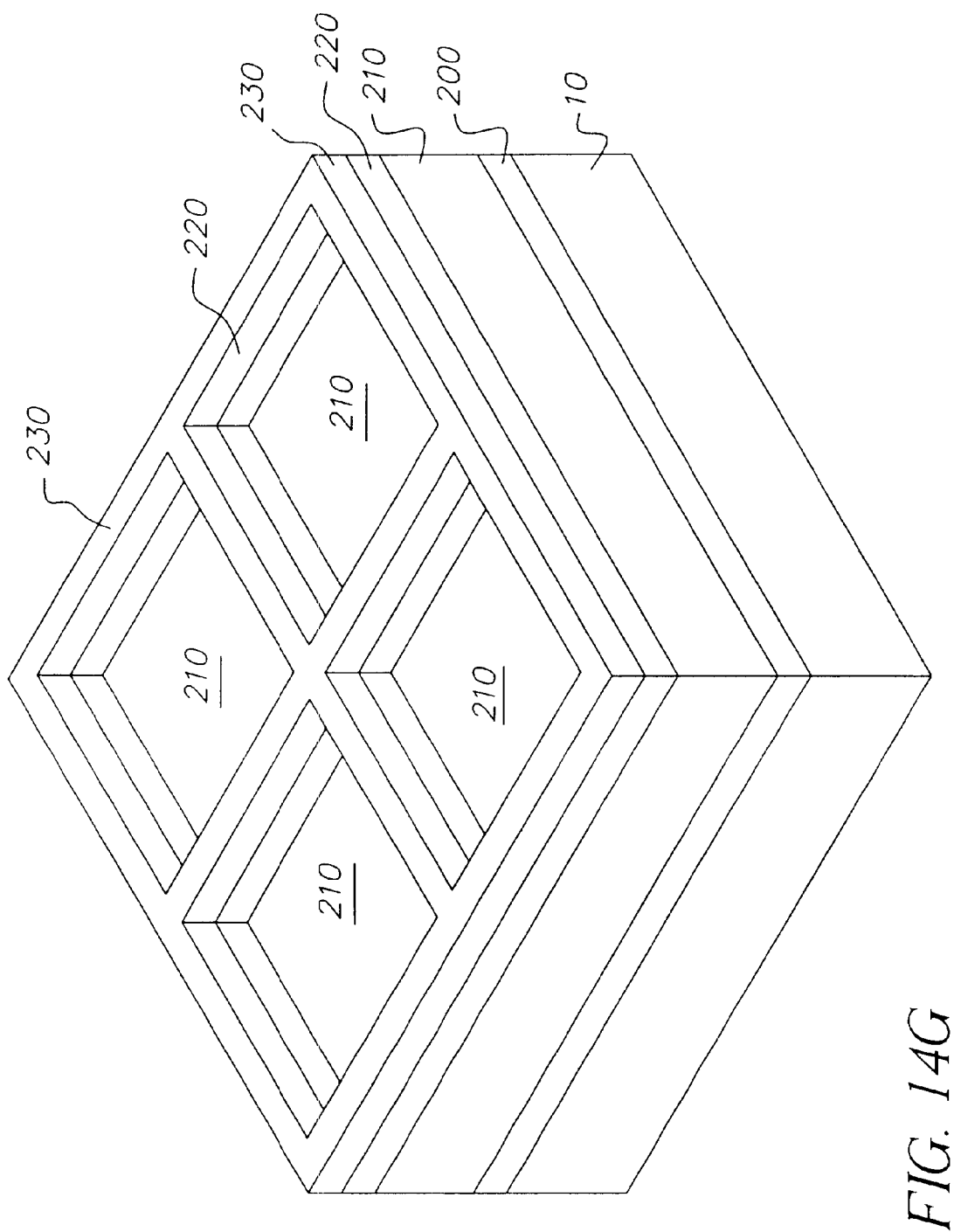
Figure 14H:
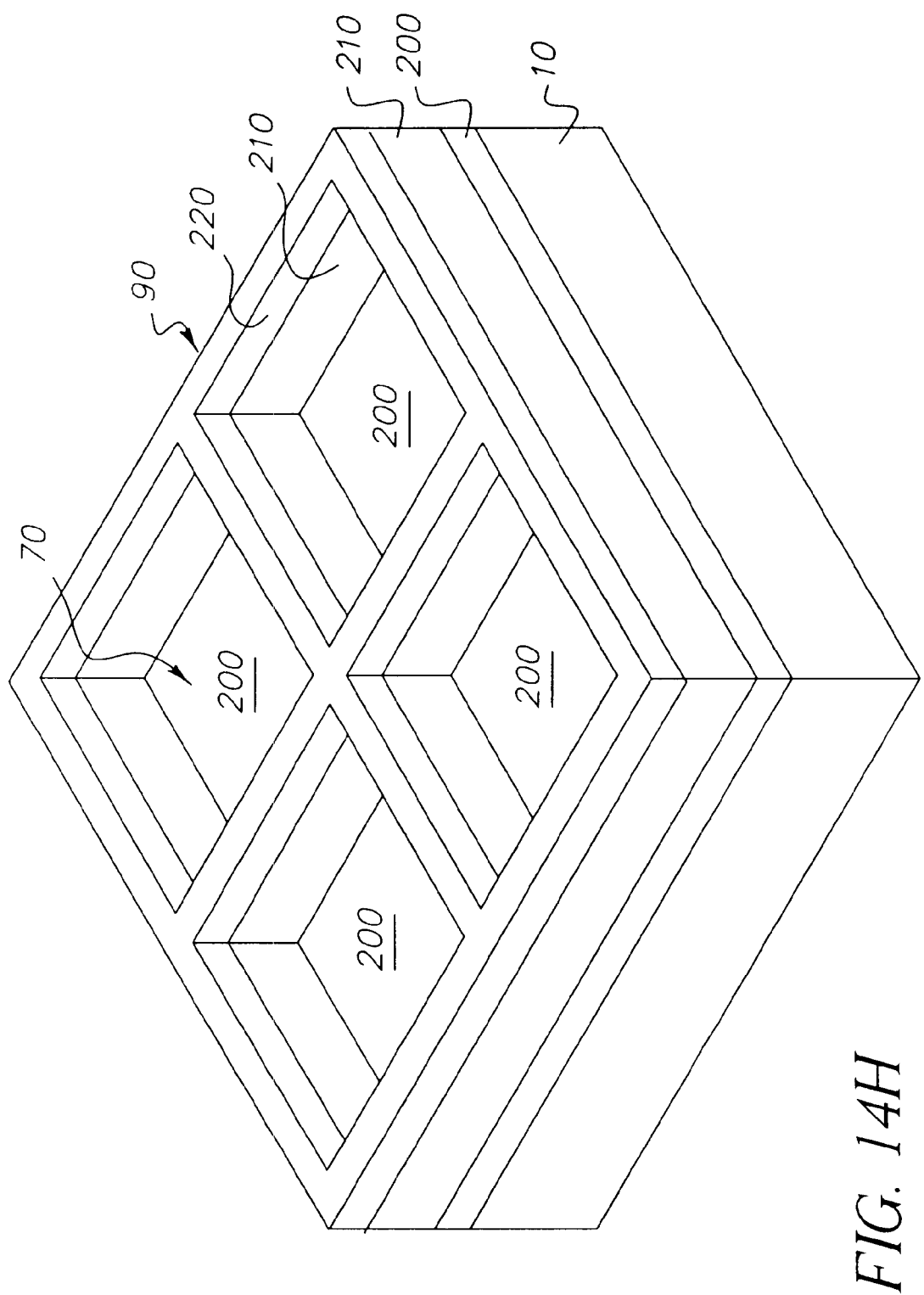
Figure 14:
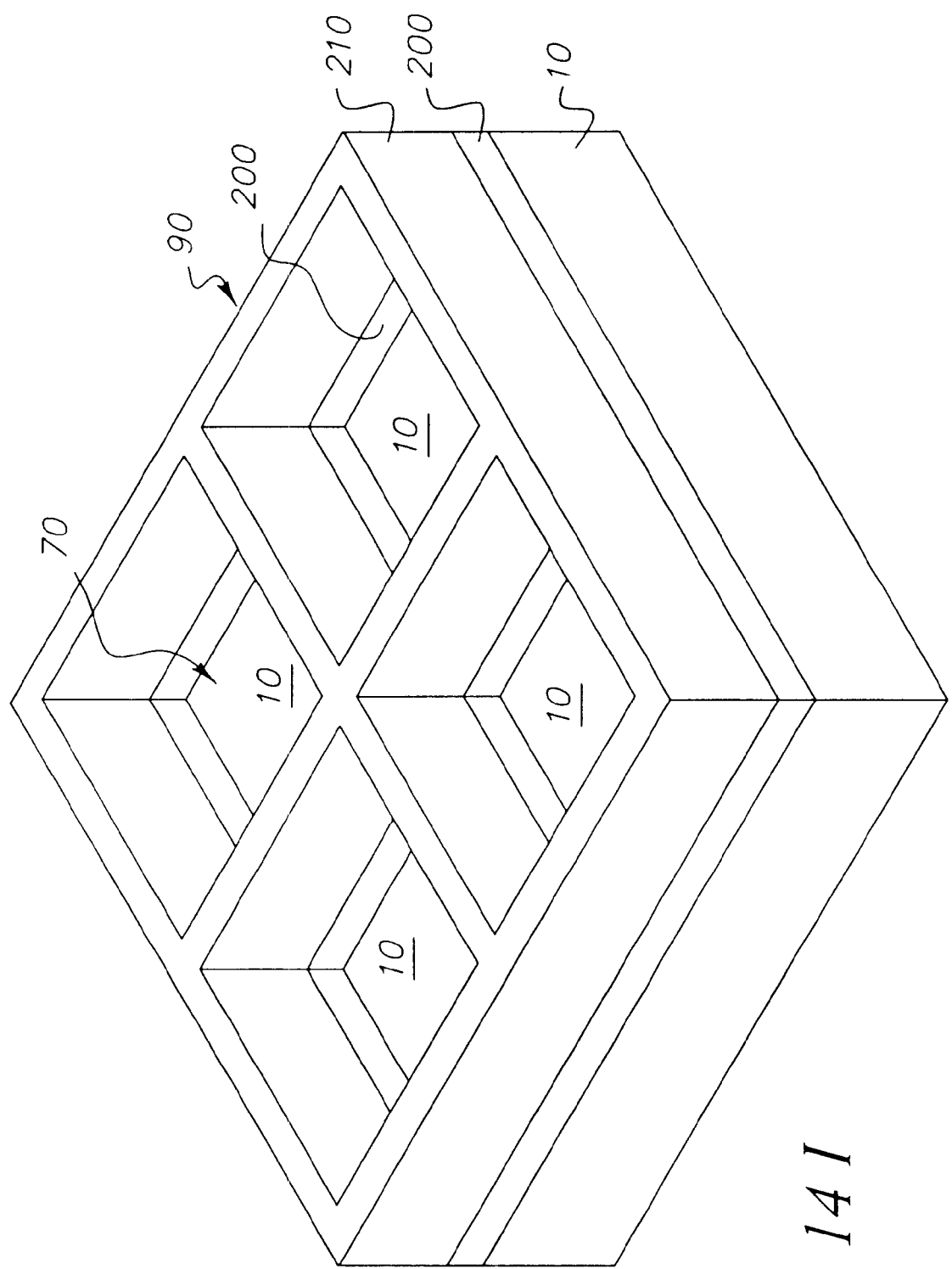
FIG. 14J represents a perspective view, partially in section, showing the interconnection of the cells of the media segment of FIG. 14I to the rest of the media.
Figure 14J:
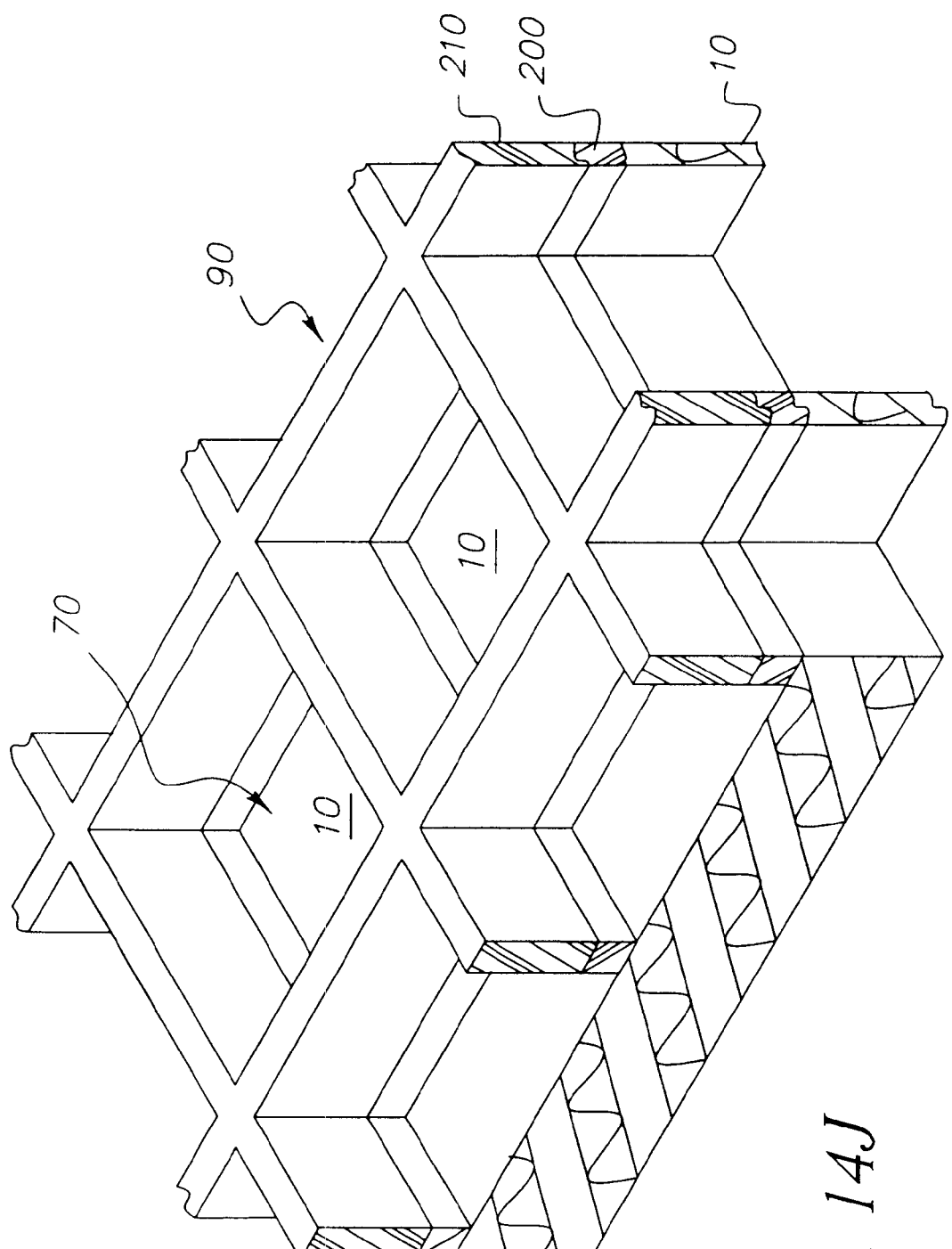

There are a number of ways to make the cells and a variety of materials that meet the requirements. The preferred way is demonstrated in FIGS. 14A–14J. In this process the cells are formed on top of the ink jet paper 10 or on the polyethylene film 30, such as shown in FIG. 9 or 13. The process starts by wet roll or curtain coating of a thin first sol-gel 1 layer 200 (which may be, for example, an aqueous solution of a silica chemical species or metal alkoxides and water in an alcoholic solvent) and then drying of this coat at near room temperature, as shown in FIG. 14B. The resulting gel is transparent and has the important property that it is not etched in oxygen plasma. Then a thick layer of a plastic film 210 is coated as shown in FIG. 14C which eventually will form the cell walls. Typically desired properties of this film are that it melts at a temperature below 100° C., forms a scratch resistant film after it cools, is impenetrable to water, air pollutants such as ozone and oils and can be doped with UV absorbers. A second sol-gel 2 layer 220 is then coated on top of the plastic layer as shown in FIG. 14D followed by a coating of photoresist 230 as shown in FIG. 14E. This photoresist film is then exposed through a mask and developed forming the pattern shown in FIG. 14F with the protective photoresist removed. For the purpose of high productivity and low cost, and to obviate problems arising from the internal stresses of the various films, it is best to utilize a web-based process for all of these steps. Now, with the photoresist as the mask, the top sol-gel layer is etched selectively in a plasma environment containing active fluorine ions that react with the Silicon in the sol-gel matrix forming volatile $SiF_4$ molecules, thus etching the layer. This removes the sol-gel in the desired areas above the plastic layer as shown in FIG. 14G. The paper is subjected next to another plasma environment this one containing oxygen ions. This process etches the plastic film and photoresist but the sol-gel layer is not affected, thus serving as the mask. As shown in FIG. 14H, the cell walls and absorbent base are thereby formed. Then the fluorine plasma etch process is repeated to remove the sol-gel 2 film on top of the cell walls as well as the sol-gel 1 film on the base of the cells as shown in FIG. 14I. The finished structure is shown schematically in FIG. 14J.

Suitable materials for the cell walls are hydrophobic polymers that are generally classified as either condensation polymers or addition polymers. Condensation polymers include, for example, polyesters, polyamides, polyurethanes, polyureas, polyethers, polycarbonates, polyacid anhydrides, and polymers comprising combinations of the above-mentioned types. Addition polymers are polymers formed from polymerization of vinyl-type monomers including, for example, allyl compounds, vinyl ethers, vinyl esters, vinyl heterocyclic compounds, styrenes, olefins and halogenated olefins, unsaturated acids and esters derived from them, unsaturated nitriles, vinyl alcohols, acrylamides and methacrylamides, vinyl ketones, multifunctional monomers, or copolymers formed from various combinations of these monomers. Preferred polymers may also comprise monomers which give hydrophilic homopolymers, if the overall polymer composition is sufficiently hydrophobic to channel the aqueous ink to the hydrophilic cell base. Further listings of suitable monomers for addition type polymers are found in U.S. Pat. No. 5,594,047 incorporated herein by reference.

In the embodiment as described in FIG. 3 where the image receiving layers are only in the base of the cells, then the cells are built on top of the polyethylene film that coats the paper base, in exactly the same way as described above. Then at the end of that process, the image receiving layers are coated over the cells and are allowed to settle into the bottom of the cells.

The entire contents of the patents and other publications referred to in this specification are incorporated herein by reference.

Parts List

10 Top swellable polymer containing mordant
20 Bottom swellable polymer containing mordant
30 Polyethylene film
40 Paper support
50 Polyethylene film
60 Backside anti-curl layer
70 Cells
80 Ink
82 First color ink
84 Second color ink
90 Hydrophobic cell walls
100 Protective layer
200 Sol-gel 1
210 Hydrophoic cell material
220 Sol-gel 2
230 Photo resist
500 Image receiving layer
510 Second image receiving layer
520 Third image receiving layer
530 Polyethylene layer
540 Paper support
550 Polyethylene layer
600 Hydrophilic ink absorbing area
610 Hydrophobic walls

What is claimed is:

1. A process for making media for receiving jetted ink, comprising providing a support, forming a multilayer on the support, and then removing the desired portions of each layer in sequence in order to form a predetermined array of three dimensional cells composed of cell walls and having a hydrophilic base.

2. The process of claim 1 wherein the multilayer is obtained by forming the following layers, in the order indicated, from the hydrophilic base: Sol-Gel 1 layer, hydrophobic cell material, Sol-Gel 2 layer, photoresist layer.

3. The process of claim 1 in which removing includes a step where the multilayer is subjected to light to form a desired cell pattern on a photoresist layer.

4. The process of claim 3 in which the multilayer is subjected to a fluorine etching subsequent to being subjected to light.

5. The process of claim 4 in which the multilayer is subjected to oxygen plasma etching subsequent to fluorine etching.

6. The process of claim 5 in which the multilayer is subjected to a second fluorine etching subsequent to oxygen plasma etching to provide the final ink-jet media.

7. The process of claim 1 wherein the material comprising the cell walls is fusible.

8. The process of claim 7 wherein the material comprising the cell walls has a melting point less than 100° C.

9. The process of claim 2 wherein the layers are formed directly on the hydrophilic base.

10. The process of claim 2 wherein the layers are formed on a hydrophobic layer bonded to the hydrophilic base.

11. The process of claim 7 wherein the cell walls contain a UV protector.

12. The process of claim 7 wherein the cell walls contain a colorant stabilizer.

13. The process of claim 1 wherein the colorant is a dye.

14. The process of claim 1 wherein the colorant is a pigment.

15. The process of claim 1 wherein the cells have a volume of at least 1 pL.

16. The process of claim 1 wherein the cells have a wall height of not more than 56 $\mu$m.

17. The process of claim 1 wherein the application of the layers and processing is conducted by moving the media on a web.

18. The process of claim 1 wherein the cell walls comprise a condensation polymer or an addition polymer.

19. The process of claim 18 wherein the cell walls comprise a polymer or copolymer containing polyesters, polyamides, polyurethanes, polyureas, polyethers, polycarbonates, and polyacid anhydrides.

20. The process of claim 18 wherein the cell walls comprise a polymer or copolymer formed from allyl compounds, vinyl ethers, vinyl esters, vinyl heterocyclic compounds, styrenes, olefins and halogenated olefins, unsaturated acids and esters derived from them, unsaturated nitriles, vinyl alcohols, acrylamides and methacrylamides, vinyl ketones, multifunctional monomers, and copolymers formed from combinations of these monomers.

* * * * *